United States Patent [19]

Jordan

[11] Patent Number: 4,982,344
[45] Date of Patent: Jan. 1, 1991

[54] ACCELERATING LINK CREATION

[75] Inventor: Daniel S. Jordan, San Francisco, Calif.

[73] Assignee: Xerox Corporation, Stamford, Conn.

[21] Appl. No.: 195,230

[22] Filed: May 18, 1988

[51] Int. Cl.$^5$ .............................................. G06F 3/00
[52] U.S. Cl. .................................. 364/521; 364/900; 364/943; 364/948.2; 364/948.22
[58] Field of Search ........ 364/518, 521, 200 MS File, 364/900 MS File

[56] References Cited

U.S. PATENT DOCUMENTS 4,613,946 9/1986 Forman ................................ 364/518
4,764,867 8/1988 Hess ..................................... 364/200

FOREIGN PATENT DOCUMENTS 0270360 6/1988 European Pat. Off. .
0287858 10/1988 European Pat. Off. .

OTHER PUBLICATIONS

*Note Cards Release 1.2i Reference Manual,* Xerox Corporation, 1985.
Henderson, Jr., D. Austin and Card, Stuart K., "Rooms: The Use of Multiple Virtual Workspaces to Reduce Space Contention in a Window-Based Graphical User Inerface", *ACM* Transactions on Graphics, vol. 5, No. 3, Jul. 1986, pp. 211–243.
Halasz, Frank G., Moran, Thomas P. and Trigg, Randall H., "NoteCards in a Nutshell", *Proceedings of the AMC CHI+GI '87 Conference,* Toronto, Canada, Apr. 5–9, 1987, pp. 1–9.
Garrett, L. Nancy, Smith, Karen E., and Meyrowtiz, Norman, "Intermedia; Issues, Strategies, and Tactics in the Design of a Hypermedia Document System", *Proceedings of CSCW'86,* Austin, Texas, Dec. 3–5, 1986, pp. 163–174.
Meyrowitz, Norman, "Intermedia: The Architecture and Construction of an Object-Oriented Hypermedia System and Applications Framework", *Oopsla '86 Conference Proceedings,* Sep. 29–Oct. 2, 1986, ppl. 186–201.
Trigg, Randy and Farley, Art, "NNCaseCluster", Xerox Corporation, 1988, pp. 1–3.
Goodman, Danny, *The Complete HyperCard Handbook,* A Bantam Book, Sep. 1987, pp. 65–67, 185–192.
*NoteCards* ® *Release* 1.1*i Reference,* Manual, Xerox Corporation, 1985.
Jensen, Anne-Marie S., Jordan, Daniel S., and Russell, Daniel M., "The Ide System for Creating Instruction", (List continued on next page.)

*Primary Examiner*—Gary V. Harkcom
*Assistant Examiner*—Michael A. Jaffe
*Attorney, Agent, or Firm*—James T. Beran

[57] ABSTRACT

A data processing system includes a workspace network data structure, such as a hypertext data structure, in which data units corresponding to displayable workspace sets such as cards are linked by linking data units. The data structure also includes a link creation data unit associated with one of the cards. When that card is displayed, a selectable link creation unit, called an AutoLink button, corresponding to the link creation data unit is also displayed. When the user selects the AutoLink button, the link creation data unit is accessed to obtain data for creating a link to another card. The data structure also includes a card creation data unit that is also accessed to create the destination card for the link. An AutoLink button can be repeatedly selected to create several new cards and links between each new card and the card with the AutoLink button. The card creation data unit can also indicate another AutoLink data unit, so that the data structure includes a sequence of link and card creation data units. When a new card is created in response to selection of an AutoLink button, it can be displayed, including any AutoLink buttons it contains. These AutoLink buttons can then be selected to create further links and cards. The AutoLink data unit can also include a parameter indicating a number of levels of links and cards to be created.

23 Claims, 9 Drawing Sheets

OTHER PUBLICATIONS presented to Applications of Artificial Intelligence and CD-ROM in Education and Training Conference, Arlington, Va., Oct. 1987.

Russell, D. M., Moran, T. P., and Jordan, D. S., "The Instructional-Design Environment", in Psotak, J., Massey, L. D., and Mutter, S. A., (eds.), *Intelligent Tutoring Systems,* Hillsdale, N.J.: Lawrence Erlbaum, 1988, pp. 203-228.

Feiner, Steven et al., "An Experiment System for Creating and Presenting Interactive Graphical Documents," *AMC Transactions on Graphics,* vol. 1, No. 1, Jan. 1982, pp. 59-77.

Halasz, Frank G., "Reflections on NoteCards: Seven Issues for the Next Generation of Hypermedia Systems", *Hypertext '87 Papers,* Nov. 1987, pp. 345-365.

Robertson, G., McCracken, D., Newell, A., "The ZOG Approach to Man-Machine Communication", *Int. J. Man-Machine Studies,* (1981), 14, pp. 461"488.

ACCELERATING LINK CREATION

BACKGROUND OF THE INVENTION

The present invention relates to user interface techniques for link creation. More specifically, the invention relates to creation of links between cards or other workspaces that may be linked into a network.

Halasz, F. G., Moran, T., and Trigg, R. H., "NoteCards in a Nutshell," CHI+GI'87 Conference, Toronto, Canada, Apr. 5-9, 1987, incorporated herein by reference, describe a hypertext-like system, identified by the term NoteCards, a trademark of Xerox Corporation. This system employs workspaces called cards, each of which occupies a part of the screen space and may contain text, graphics, bitmap images, etc. Multiple cards can be displayed simultaneously, each in a separate window as shown and described in relation to FIG. 1. A card can be connected to another card by a link, represented within the contents of the originating card by a display object called a link icon, which may be a box with the title of the destination card. When a user selects a link's icon with a mouse button click, the destination card of that link is displayed.

NoteCards TM Release 1.2i Reference Manual, Xerox Corporation, 1985, ("the NoteCards Manual"), also incorporated herein by reference, describes the conventional technique for creating a link in NoteCards. This technique, described at pages 13-14 and 22, includes a number of steps each performed by selecting a location on the display with a mouse and clicking a button on the mouse at the selected location. First, the user selects and clicks the location of the new link in the text of the source card. Then, the users selects and clicks a new link operation within a menu. The user selects and clicks the type of the new link on another menu. Unless the destination card is an existing card, the user selects and clicks the creation of a new destination card on yet another menu. The user selects and clicks the type of the new card on a further menu. The user performs additional selection and typing operations to name the new card. Techniques for moving or copying an existing link icon from one card to another are described at page 75. Techniques for creating a link from the NoteCards browser are described at page 80. Insertion of multiple links is described at page 82.

Meyrowitz, N., "Intermedia: The Architecture and Construction of an Object-Oriented Hypermedia System and Applications Framework," OOPSLA '86 Conference Proceedings, Sept. 29-Oct. 2, 1986, Portland, OR., pp. 186-201, describes a hypermedia system, Intermedia, that also includes link creation. As described at page 188, the process of creating links includes a number of steps: create a source selection, called a block; choose the "start link" command; pick a destination block; and choose the "end link" command. The result of this linking operation is a bidirectional tie between the source block and destination block such that when a user selects a block and issues the "follow" command, the document containing the companion block is retrieved from storage, if necessary, and displayed, as shown in FIG. 1. Page 192 describes how links are records that keep track of two connected blocks as well as link keywords, creation and modify time, author, and other link-specific data. Garrett, L. N., Smith, K. E., and Meyrowitz, N., "Intermedia: Issues, Strategies, and Tactics in the Design of a Hypermedia Document System," *Proceedings of CSCW '86*, Austin TX., Dec. 3-5, 1986, pp. 163-174, also describe Intermedia. Pages 163-164 describe the linking of information including: indicating a source selection in a document, choosing the Start Link command, indicating a destination selection, and choosing the Complete Relation command. The selection of commands is illustrated in FIGS. 1a and 1b. Linking is discussed in more detail at pages 165-168. Pages 167-168 describe enhancing link functionality by techniques including automatically-created links for an on-line encyclopedia; a footnote link type represented by an automatically-numbered icon; a vocabulary link type that automatically finds the definition to link to in a dictionary file; user-defined links; and conditional links whose destination depends on user's expertise or previous path.

Henderson, D. A., Jr., and Card, S. K., "Rooms: The Use of Multiple Virtual Workspaces to Reduce Space Contention in a Window-Based Graphical User Interface," *ACM Transactions on Graphics*, Vol. 5, No. 3, July 1986, pp. 211-243, describe a window management system for a workstation that includes virtual workspaces called Rooms that are linked, the links being represented by icons called Doors as shown and described in relation to FIG. 9. As described at page 222 and in more detail at pages 229-230, when a user selects a Door's icon to leave one Room and enter another, the entered Room contains a Back Door that can be selected to return to the Room from which the user came. This Back Door is created at the time the user selects the icon to enter that Room, and its purpose is to simplify the task of returning to a previous Room. Techniques for creation of other Doors are described at pages 233-234. Rooms, Doors and Back Doors are trademarks of Xerox Corporation. This system is also described in detail in copending, coassigned U.S. patent application Ser. No. 030,766, entitled "User Interface with Multiple Virtual Workspaces for Sharing Display System Objects," incorporated herein by reference and discussed below.

SUMMARY OF THE INVENTION

The present invention provides techniques for accelerating link creation that are especially useful in a hypertext-like system.

One aspect of the present invention is based on the recognition of a practical problem in a hypertext-like system such as NoteCards. Such a system typically includes a data structure with a number of data units, each of which corresponds to a card or to some other set of displayable workspaces. These data units are linked into pairs by data in the data structure. As a result, the data structure provides a network of linked data units, each corresponding to a card.

The user interface of such a system typically enables the user to view one or more of the cards. A displayed card includes linking icons or other selectable linking units that represent links to other cards. When the user selects a linking icon, the system responds by accessing the linked data unit and displaying the corresponding card.

A user of such a system will often find it useful or necessary to create a new link between cards. To add a link between cards, the user must conventionally go through a series of several steps, as described above. To create the large number of links necessary to build a complex network of cards, the user must repeatedly perform those steps, an extremely inefficient process.

The present invention solves this problem by enabling a user to create a link between cards with a single manual operation such as a mouse click. This solution can be implemented by providing an area within a card that the user can select to create a new link between that card and another card. This area, referred to herein as a selectable link creation unit, can be an area within text in a card, for example. When the user selects the selectable link creation unit with a mouse click or other operation, a selectable linking unit such as a link icon is added to the displayed card's contents, representing the new link. This link icon can, for example, be displayed adjacent to the selectable link creation unit; if the card contains a sequence of text, the link icon can appear immediately after the selectable link creation unit in the text. The user can then follow the new link to the other linked card by selecting the new linking unit.

A closely related aspect of the present invention is based on the recognition that several kinds of data may be necessary for creation of a new link. The data necessary for creation of a link include at least identifiers of the linked cards, which may be a source card and a destination card, for example. The link creation data may also include a display position of the link's icon within the source or destination card; a link type in systems that permit more than one link type; the card type of the destination card; the title and other characteristics of the destination card, including whether it is displayed when the link creation unit is selected. The link creation data can also include characteristics of the link creation process.

Conventional link creation techniques require a series of steps to create each link because the user must provide this link creation data. If the sole action needed to create a link is to select a link creation display unit, this data must be provided in some manner other than a series of input actions by the user. Similarly, to enable the user to rapidly create a chain of linked cards, the data to create all of the links and cards in the chain must be provided in some other manner. Furthermore, if the user can rapidly create a complex network of data units including a number of branches that are substantially the same or can rapidly create a number of similar networks, much of the data for link and card creation is the same for many of the links and cards. In all these cases it would be inefficient for the user to repeatedly provide a series of input actions to enter these redundant parameters.

The present invention solves these problems by having link and card creation data available prior to the user's selection of each link creation display unit. Some of the link creation data can be obtained based on the position of the selected link creation display unit, which indicates, for example, the identifier of the source card. Other data can be included in the underlying workspace network data structure in the form of a link creation data unit. This link creation data unit can be associated with a workspace data unit corresponding to the source of the new link, so that when the user selects the link creation display unit, the link creation data unit can be accessed and a linking data unit for the new link can be created in the workspace network data structure. Furthermore, if the link's destination is a new card, data necessary for creating a data unit corresponding to that card can also be associated with the source card's data unit, so that the new card's data unit can similarly be created in the workspace network data structure. As discussed below, other techniques according to the invention build on the technique of creating link and card creation data units in a workspace network data structure prior to link and card creation.

It is sometimes desirable to be able to create a number of links and cards without repeating the steps necessary to include link creation data in the data structure. For example, the same link creation data unit can be repeatedly accessed to create a number of links. Each of these new links can lead to a respective new card, for example, with each of the links and each of the new cards being initially alike when created. The link creation data unit can include an indication of whether the corresponding selectable link creation unit can be repeatedly selected to create a number of links in this manner, or can only be selected once after which it is replaced by the new link's icon resulting from that selection. Also, the link creation data unit can include data indicating a location of the selectable linking unit in relation to the selectable link creation unit, such as whether it should appear immediately before or after the selectable link creation unit in the text of a card.

It is also desirable to be able to create a chain or branch of linked cards. This can be done by accessing a sequence of link and card creation data units when a selectable link creation display unit is selected. Selection of the display unit can cause creation of one level of the network or it can cause creation of several levels.

A single-level technique could be implemented by creating one link and its destination card in response to each selection of a link creation display unit. In this technique, each link creation data unit in the sequence can have an associated card creation data unit, and the link creation data unit and associated card creation data unit can accordingly be accessed to create a link to a new card. Each unit of card creation data in turn can have an associated unit of link creation data, so that when a link to the corresponding new card is followed, the card can appear with a link creation display unit. This link creation display unit in the new card can then be selected to create a new link to a further new card, and so on. With this single-level technique, a chain or branch of linked cards can be rapidly created simply by selecting link creation display units in successively created new cards.

The single-level technique described above may still be somewhat inefficient, especially if a chain or branch of several linked cards occurs frequently. Therefore, it is useful to have a multi-level technique that creates links at more than one level of the network in response to a selection. To implement this technique, a link creation data unit can include data indicating the number of levels of the network to be created when the user selects the corresponding selectable link creation unit. In response, that number of levels of the network are created by successively creating, for each link creation unit at a level, the corresponding link and its destination card. The next level of the network can then be created based on the link creation units in the destination cards of the previous level, until the indicated number of levels is created. The link creation data unit can also include data indicating the number of levels of the newly created cards that should be displayed.

In summary, a sequence of link and card creation data units like that described above can be used for rapid link and card creation. Each link creation data unit can be accessed to create a number of links to new cards to initiate a number of similar chains or branches. Each card creation data unit can in turn lead to a number of link creation data units, so that when a link to the corresponding new card is followed, the card will appear with a number of selectable link creation units, allowing the user to initiate several different kinds of sub-branches. Each of these can then be selected to create new links to further new cards, and so on. And the multi-link technique described above can be applied to determine how many levels of links and cards are created and displayed when the user selects a selectable link creation unit. In this way, a complex network can be rapidly created.

To provide further power, the selectable link creation display unit corresponding to the beginning of a sequence of link and card creation data units can be copied, and the user can select the resulting selectable link creation unit to create another branch. In this way, a variety of complex networks can be created starting from a single selectable link creation unit by copying it and developing a different network from each copy.

In general, the technique of providing link and card creation data prior to selection of a link creation display unit can be implemented by providing standard link and card creation data units that the user can copy as described above. On the other hand, a user may desire to set up a non-standard link creation data unit. This can be implemented, for example, by obtaining link creation data interactively from the user prior to display of the selectable link creation unit. The resulting link creation data unit in the workspace network data structure can then be accessed each time the corresponding selectable link creation unit is selected.

The following description, the drawings and the claims further set forth these and other objects, features and advantages of the invention.

DETAILED DESCRIPTION

A. General Features

Figure 1A:
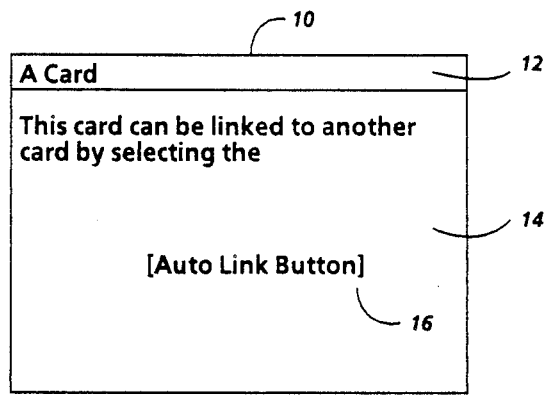
FIG. 1A is a schematic view of a card, including a selectable link creation unit according to the invention.
Figure 1B:
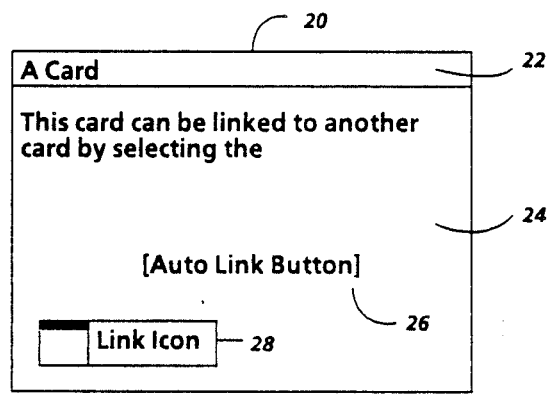
FIG. 1B is a schematic view of the card of FIG. 1A, showing the results of selecting the link creation unit.
Figure 2:
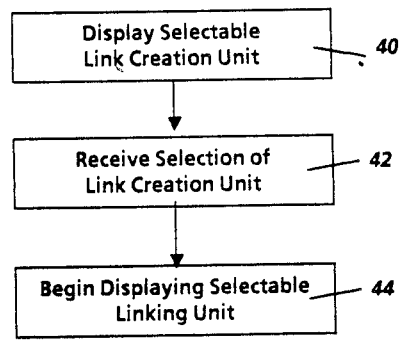
FIG. 2 is a flowchart showing the general user interface steps of link creation according to the invention.
Figure 3:
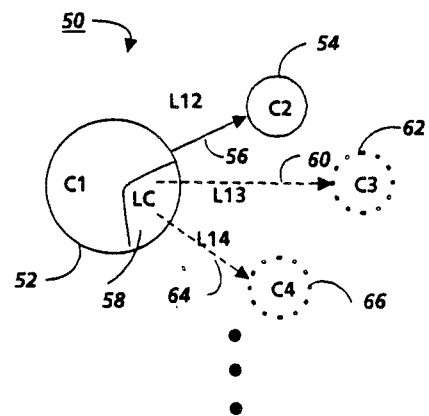
FIG. 3 is a schematic representation of a simple workspace network data structure including a link creation data unit according to the invention.

The general features of the invention can be understood from FIGS. 1A—3. FIGS. 1A and 1B each show a card with a selectable link creation unit called an AutoLink Button, FIG. 1A being before and FIG. 1B being after the user selects the AutoLink Button. FIG. 2 shows the user interface steps taken in relation to FIGS. 1A and 1B. FIG. 3 illustrates features of a data structure that can be used for accelerated link creation.

FIGS. 1A and 1B show cards 10 and 20, respectively, as they would appear on the display of a data processing system. Cards 10 and 20 are similar to the cards presented by the NoteCards system. Each card includes a title area 12 or 22 and a body 14 or 24. The body of each card includes AutoLink Button 16 or 26. In response to selection of AutoLink Button 16, card 20 also includes Link Icon 28.

The following conceptual framework is helpful in understanding the broad scope of the invention. A wide variety of display-based user interfaces are available for data processing systems including, for example, various graphical user interfaces, but, despite their diversity, these interfaces tend to have certain common characteristics. One common characteristic is a correspondence between data within the data processing system and features that appear on the display. In this application, the term "data unit" refers to a unit of data within the data processing system, while the term "display unit" refers to a humanly perceptible part of what is displayed.

1. Display Units. FIGS. 1A and 1B illustrates several different types of display units. A conceptual framework that forms a basis for understanding the types of display units is set forth in copending, coassigned U.S. patent applications Ser. Nos. 030,766, entitled "User Interface with Multiple Workspaces for Sharing Display System Objects" and filed Mar. 25, 1987 ("the multiple workspace application"), and 127,997, entitled "Multiple Shared Virtual Workspaces" and filed Dec. 2, 1987 ("the shared workspace application"). The multiple workspace application and the shared workspace application are both incorporated herein by reference. The conceptual framework set forth in those applications can be extended as set forth below, and the terms defined below have the meanings indicated throughout this application, including the claims.

An important type of display unit for this invention is a "selectable unit," defined herein to mean a bounded display area that the user can select. The term "select" is used herein to mean a user input operation that includes a signal that uniquely identifies the selectable unit by indicating a position within it. The user can, for example, use a pointing device such as a mouse to select a selectable unit as part of a request that an operation be performed on data corresponding to the selected unit. A larger selectable unit may include smaller selectable units within its area, in which case the user will provide a different signal to select the larger selectable unit than to select the smaller selectable units within it.

Selectable units differ in different user interface systems. In FIGS. 1A and 1B, AutoLink Buttons 16 and 26 and Link Icon 28 are examples of selectable units, as will be discussed in more detail below. In addition, cards 10 and 20 may be selectable, and characters, words or sentences in bodies 14 and 24 may be selectable during editing.

In general, a selectable unit may take any appearance, and is not limited to a visually distinguishable feature or set of features that appears to be a coherent unity. A selectable unit may thus be a part of such an object, may be coextensive with such an object, may include a number of such objects, or may be any area of the display, even a blank featureless area or an arbitrarily bounded area in a graphical or geometrical pattern.

Another type of display unit is a "workspace," defined herein to mean a display unit that is capable of including one or more display features, with each feature in the workspace having a respective position. A workspace can be within a visible boundary on the display, as cards 10 and 20 and Link Icon 28 illustrate. But a workspace may not have visible outer boundary, as AutoLink Buttons 16 and 26 illustrate. The entire CRT screen or other display area that includes cards 10 and 20 is a workspace whose outer boundary is not displayed, but is defined by the edge of the display area. Other common examples of workspaces are windows and menus.

Some workspaces, such as Link Icon 28 and AutoLink Buttons 16 and 26, are selectable units. In general, however, the criterion for determining whether a display unit is a workspace is whether it appears to the user as including one or more display features, each having a respective position. The criterion for determining whether a display unit is a selectable unit is whether the user can select its display area.

A workspace is called a "virtual workspace" if part or all of it may not be displayed at a given time. Even though a workspace is virtual, part or all of it may be made real by being displayed. Conventional user interfaces commonly permit the user to make a workspace transition such as beginning to display part or all of a virtual workspace or ceasing to display a virtual workspace. For example, a user may select an icon and request an open operation to obtain a display of the corresponding window. Similarly, a user could select a close button to end display of that window.

The conventional NoteCards user interface enables the user to make a workspace transition by selecting a link icon such as Link Icon 28 in FIG. 1B. A link icon can be thought of as a linking two cards, each of which is a virtual workspace. The NoteCards system is an example of a hypermedialike system, and each end of a link in such a system is conventionally classified as local or global. A link with a local source or destination links to a specific location within its source or destination workspace, respectively. A link with a global source or destination is linked to the source or destination workspace as a whole, however, rather than to a specific location. A link icon with a local source may thus appear in one of two linked cards, called the source card, whenever that card is displayed. A link icon with a global source, on the other hand, may appear in a special window adjacent the source card. When the user selects a link icon, the other card, called the destination card, is displayed.

The present invention has been developed for the NoteCards user interface in which cards can be linked by a link icon with a local or global source and a global destination. If the user selects a link icon, display of a destination card begins. The present invention is also applicable, however, to other types of workspaces, including windows, tiles, desktops, and the others described in the multiple workspace and workspace sharing applications, and is also applicable to user interfaces capable of making workspace transitions between sets of workspaces, each including more than one workspace. Furthermore, it is applicable to user interfaces in which the user selects selectable units other than icons to initiate a transition involving a workspace or a set of workspaces, and is also applicable to user interfaces that display selectable linking units in positions other than within a workspace in one of the linked workspace sets.

In general terms, Link Icon 28 is an example of a selectable linking unit that links a source workspace set, in this case card 20, to a destination workspace set, in this case a card not yet displayed. AutoLink Buttons 16 and 26, in contrast, are examples of selectable link creation units. FIG. 2 illustrates their function. A selectable link creation unit such as AutoLink Button 16 is initially displayed, as shown in box 40. In box 42, a signal is received from the user selecting the displayed link creation unit. In response, in box 44, display of a selectable linking unit such as Link Icon 28 begins.

The steps shown in FIG. 2 could be implemented in a variety of ways. We turn now to consider data units within a data processing system on which those steps could be implemented.

2. Data Units. In general, the term "data unit" is used herein to mean any identifiable unit of data. As noted above, one common characteristic of user interfaces is that data within the data processing system corresponds to features on the display. Therefore, a display unit, as defined above, typically corresponds to a data unit that includes data relating to that display unit. Furthermore, the relations between display units often correspond to associations between the corresponding data units.

Data units may be associated in any of a number of ways. For example, two data units are associated if one includes the other, if the two are both included in a third data unit, or if the two both include a third data unit. Also, two data units are associated if one includes an item of data, such as a pointer or handle, that can be used to retrieve the other. Similarly, two data units are associated if both are associated with a third data unit; for example, a third data unit such as a table entry or other data structure could be associated with both of them by including a pointer to each of them. As used herein, the term "associated" covers any type of association between data units. The term "data structure" is sometimes used herein to mean a data unit that includes one or more other units of data as well as data defining one or more associations of an included unit of data.

Data structure 50, represented graphically in FIG. 3, includes a number of other data units and their associations. Circles 52 and 54 represent workspace data units; each is a data unit including data relating to a respective set of workspaces, the workspace data units being identified respectively as C1 and C2. For example, workspace data units C1 and C2 could each include the data relating to a single card.

Circles 52 and 54 are connected by arc 56, representing a linking data unit identified as L12. Linking data unit L12 includes data relating to an association between workspace data units C1 and C2. Linking data unit L12 could be included in data structure 50 in any appropriate manner, including any of those discussed above. In general, the term "linking data unit" is used herein to refer to any data that associates workspace data units.

Data structure 50 can be referred to as a "workspace network data structure" because it includes at least one workspace data unit with data relating to a set of workspaces. Typically, a workspace network data structure will also include data associating workspace data units, such as the linking data units in data structure 50. A workspace network data structure can therefore correspond to a network of linked workspace sets.

Also associated with workspace data unit C1 is link creation data unit LC, represented by segment 58 of circle 52 in FIG. 3. Link creation data unit LC can be accessed to create one or more additional linking data units in workspace network data structure 50. As used herein, the term "create a data unit" means whatever combination of data processing operations are necessary to construct a data unit and include it in a given data structure. For example, if a data unit is to be included in a workspace network data structure by being accessible through a hash table or other such accessing table of that data structure, creating the data unit includes both constructing it and setting up an entry for the data unit in the table. If a data unit is included by being accessible through a pointer in another data unit that is already in the data structure, creating the data unit includes both constructing it and including a pointer to it in the other data unit. If a data unit is included by including its data in an open field in another data unit already in the data structure, creating the data unit is completed by including its data in that open field.

Arc 60 leading to circle 62 and arc 64 leading to circle 66 represent two of the additional linking data units that can be created based on link creation data unit LC. These potential linking data units, designated L13 and L14, lead respectively to workspace data units C3 and C4. Arcs 60 and 64 are dashed to indicate that linking data units L13 and L14 do not yet exist. Similarly, circles 62 and 66 are dashed to indicate that workspace data units C3 and C4 may not yet exist. As can be understood from FIGS. 1A, 1B and 2, selection of a selectable link creation unit corresponding to link creation data unit LC would result in creation of workspace data unit C3, unless it already exists, and of linking data unit L13 between workspace data units C1 and C3. A second selection of the same selectable unit would similarly result in creation of workspace data unit C4 and linking data unit L14, and so forth for additional selections.

We turn now to consider in more detail how the general features illustrated in FIGS. 1A-3 could be implemented. After considering a data structure and system for implementing the invention, we will consider several user interface techniques.

B. Data Structure and System

Figure 4:
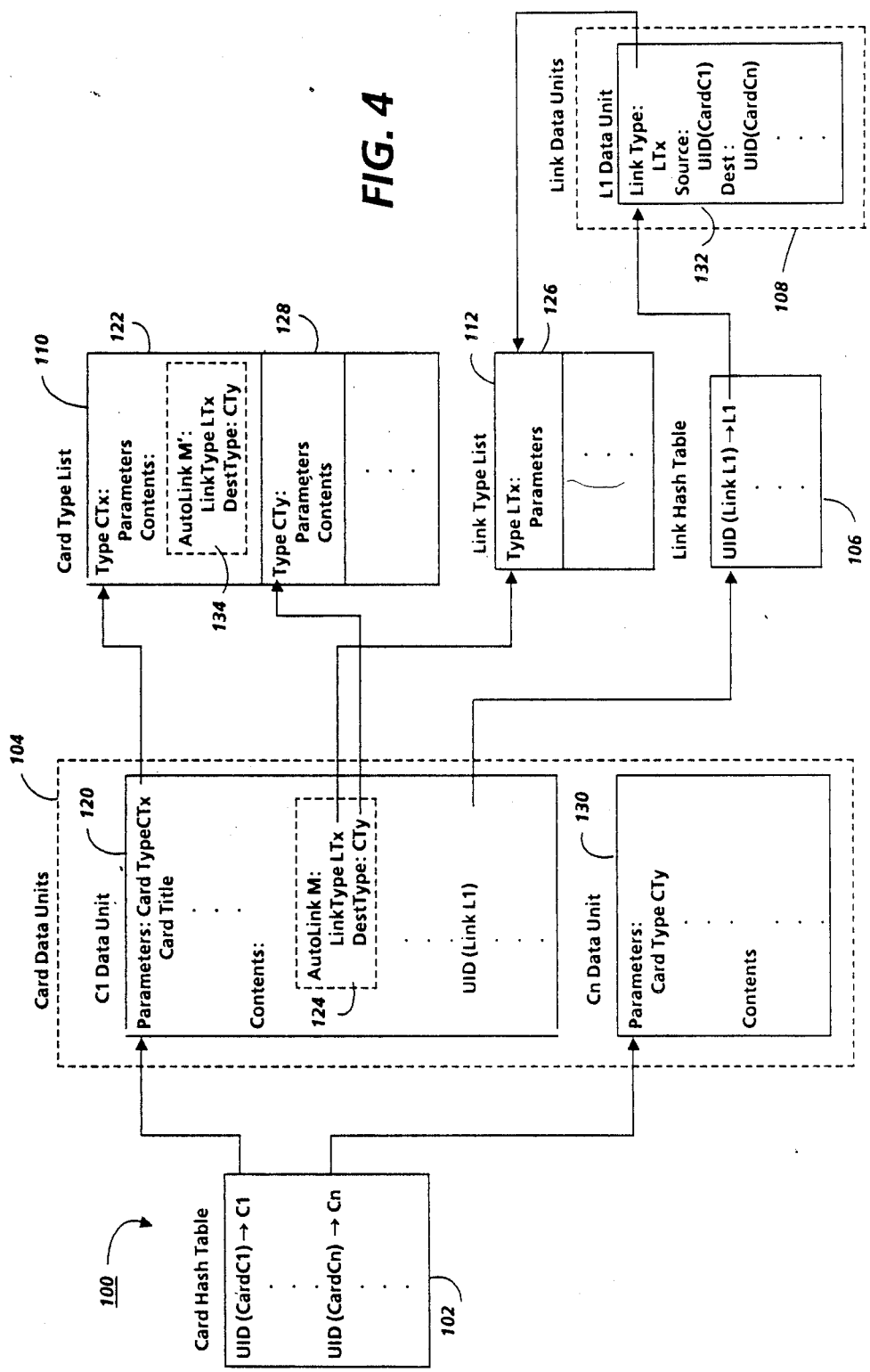
FIG. 4 is a more detailed schematic representation of a workspace network data structure including a link creation data unit according to the invention.
Figure 5:
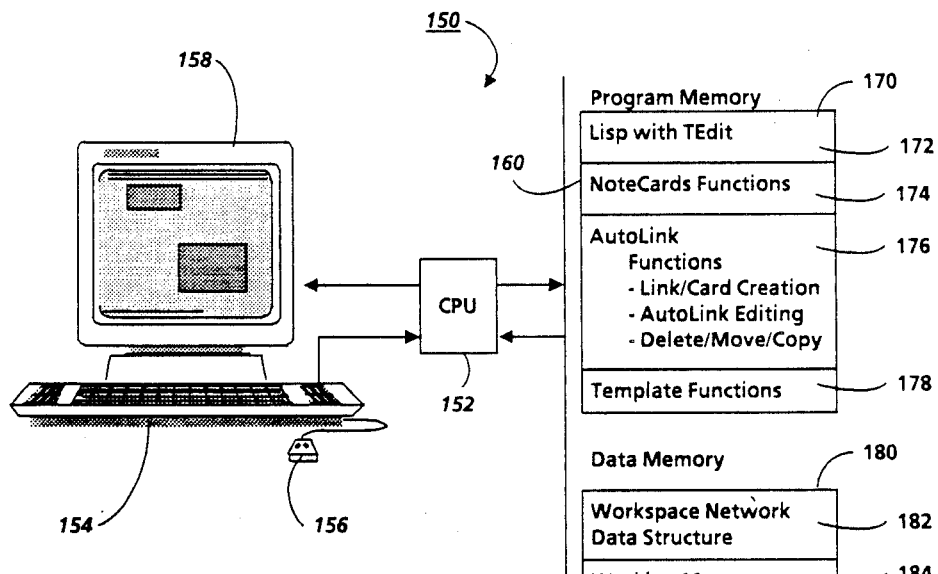
FIG. 5 is a schematic diagram of a system that includes a workspace network data structure according to the invention.

The invention could be implemented with a wide variety of data structures and in a wide variety of data processing systems. FIG. 4 shows in greater detail a workspace network data structure in which the invention could be implemented. FIG. 5 shows a data processing system that includes a data structure like that of FIG. 4.

Data structure 100 in FIG. 4 includes a number of interrelated data units. FIG. 4 also illustrates relationships between these data units that affect accelerated link creation.

Data structure 100 can be accessed through card hash table 102 based on a unique identifier (UID) of a card that serves as a hash key. When accessed with the UID of a card, hash table 102 returns a value that can be used to access one of card data units 104 corresponding to that card. Card data units 104 need not be collected into a list or table, because card hash table 102 provides access to each card's data unit wherever it is located in the available addressable space.

A card's data unit can in turn include a UID of a link to another card, and that UID can be used as a hash key to access link hash table 106. Link hash table 106 similarly returns a value that can be used to access one of link data units 108 corresponding to that link. Link data units 108, like card data units 104, need not be collected into a list or table because of link hash table 106.

A card's data unit can also include an AutoLink data unit for creating a new link between that card and another card. The AutoLink data unit can include the link type of the new link and the card type of the new card. These types can in turn be used to access card type list 110 and link type list 112 to obtain data for creating the new link and card.

FIG. 4 shows that card hash table 102 includes an entry that is accessed in response to a key that is the UID of Card C1 and that returns the value "C1." That value can then be used to access the corresponding C1 data unit 120 in card data units 104. C1 data unit 120 includes data items defining parameters of the card. Two of the parameters, the card type CTx and the card title, are shown. The card type CTx could be used to access corresponding CTx entry 122 in card type list 110.

C1 data unit 120 also includes data items defining the contents of card C1 when displayed. Included in the contents is an AutoLink data unit 124, designated AutoLink M, that includes data for creating a new link between card C1 and a destination card. AutoLink data unit 124 includes link type LTx indicating the type of the new link and destination type CTy indicating the type of the destination card.

The contents of C1 data unit 120 also include the UID of link L1 from card C1 to another card. Link L1 could be created in response to a user signal selecting the selectable link creation unit in card C1 corresponding to AutoLink M. In the creation of Link L1, link type LTx could be used to access entry 126 in link type list 112 to obtain parameters of link L1. If the user signal indicates that the destination card is a new card, destination type CTy could be used to access entry 128 in card type list 110 to obtain parameters and contents of the new card. An entry can be added to card hash table 102 for the new card, and Cn data unit 130 can be added to card data units 104 to include the parameters and contents of the new card. Similarly, an entry can be added to link hash table 106 for the new link and L1 data unit 132 can be added to link data units 108 to include the parameters of the new link.

Card type list 110 can include both card types that can be included in an AutoLink data unit, referred to as template cards, and other card types that serve other purposes. Non-template card types that occur in Note-Cards include Browser cards and Filebox cards. Entry 122 in card type list 110 illustrates a template card type that includes in its contents an AutoLink data unit 134, designated AutoLink M'. C1 data unit 120 could itself have been created in response to an AutoLink selection by accessing entry 122 and including the contents found there in C1 data unit 120. Techniques such as this for link and card creation are discussed in greater detail below in relation to user interface techniques.

Although AutoLink data unit 124 in FIG. 4 could have been copied from AutoLink data unit 134 in entry 122 of card type list 110, AutoLink data units, like card data units and link data units, could alternatively be available through an AutoLink type list resembling card type list 110 and link type list 112. In such an implementation, an entry in card type list 110 could include an AutoLink type, resulting in an access to the corresponding entry in the AutoLink type list during creation of a card of the corresponding type. The contents of that entry could then be used to create an AutoLink data unit within the newly created card's data unit.

FIG. 4 illustrates only part of the data that can be included in workspace network data structure 100. The contents of each card, whether in card data units 104 or in card type list 110, can include text or other data for display, in addition to AutoLinks and links. If the contents are text, the position of an AutoLink button and a link icon can be indicated by the position of the Auto-Link data unit and the link title in the sequence of text data. Furthermore, data relating to the appearance of an AutoLink button or link icon could be included. Each AutoLink data unit could include additional data relating to a new destination card, including, for example, data indicating whether it is displayed when created, whether it should be filed, its title or a default title and whether the user should be prompted for a title. Each AutoLink data unit could also include data indicating the number of levels of the network to be created when the corresponding AutoLink button is selected. Each AutoLink data unit could also include data indicating the location of each link icon created when the corresponding AutoLink button is selected.

The data in workspace network data structure 100 could be organized much differently than shown in FIG. 4. For example, the data in each link data unit could instead be included in the source card's data unit in card data units 104, in the same way AutoLink data unit 124 is included as a text object in C1 data unit 120. Or each AutoLink data unit could be moved into an independent data unit accessible through a hash table analogous to link hash table 106.

FIG. 5 shows system 150 including a workspace network data structure like that described in relation to FIG. 4. CPU 152 receives user input signals from keyboard 154 and from mouse 156 or other input pointing device through which the user can select a selectable unit presented on display 158. In response, CPU 152 accesses memory 160, executing instructions from program memory 170 and retrieving and storing data in data memory 180. CPU 152 also modifies the image presented on display 158 in accordance with its operations.

Program memory 170 includes instructions to accomplish several different purposes. The software in Xerox Lisp 172, including TEdit, supports NoteCards functions 174, and these items of software together provide the underlying NoteCards user interface. In addition, AutoLink functions 176 provide a number of functions relating to accelerated link creation through selection of an AutoLink button, including the operations of link and card creation; editing operations on an AutoLink data unit, including AutoLink creation; and deleting, moving and copying AutoLink buttons. Similarly, template functions 178 provide a number of functions relating to template cards, including creation, editing, deleting and copying.

Data Memory 180 includes workspace network data structure 182, organized as described above in relation to FIG. 4. In addition, working memory 184 provides additional temporary memory capacity.

We turn now to examine in more detail the user interface features provided by AutoLink functions 176 and template functions 178.

C. User Interface

The workspace set and linking data units of a workspace network data structure like that of FIG. 4 correspond respectively to displayable workspace sets and to links between those workspace sets. We turn now to examine functions that enable a user to extend and modify a workspace network data structure and perform related operations. We will examine functions that could be included in AutoLink functions 176 and template functions 178. After first examining functions relating to creation, editing and other operations on AutoLinks and templates, we will examine the functions that occur when an AutoLink button is selected for link and card creation.

Figure 6:
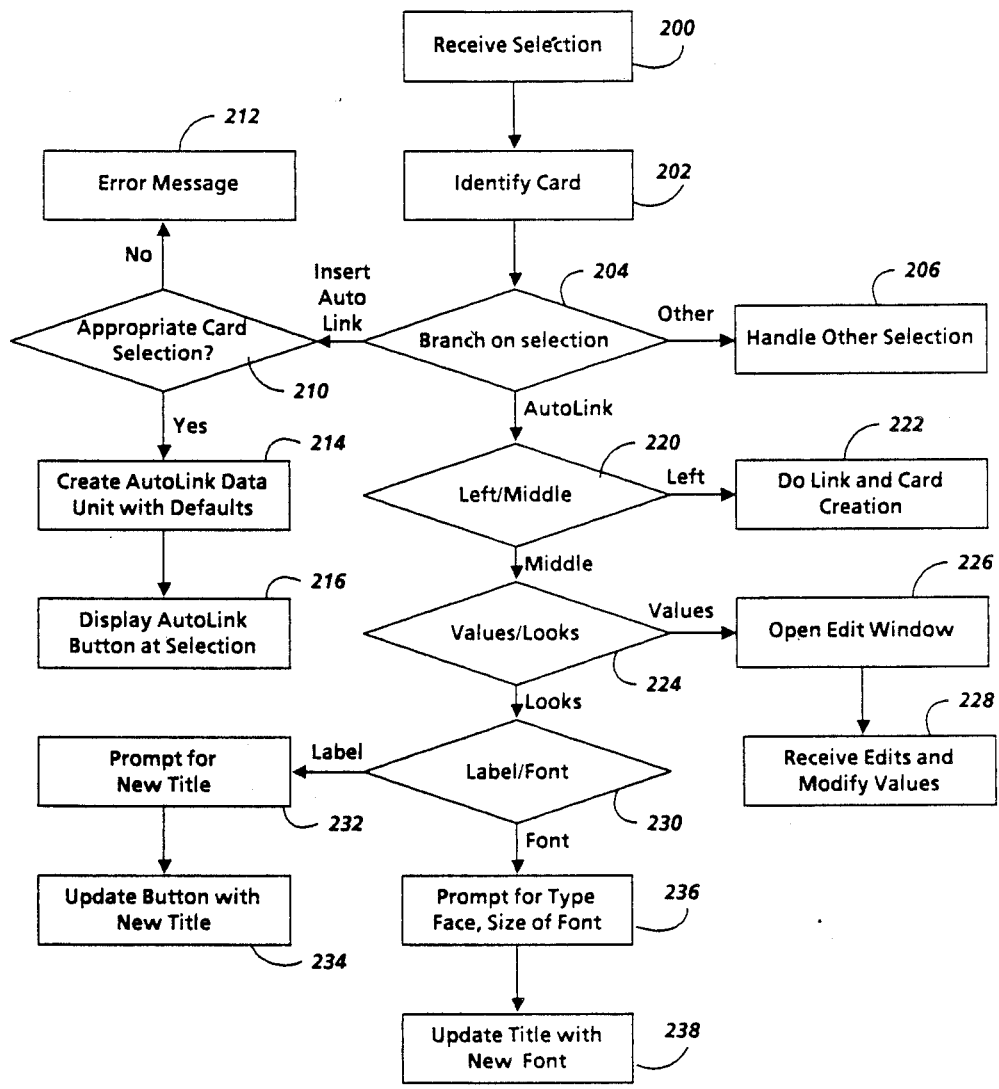
FIG. 6 is a flowchart of steps in creating and editing a link creation data unit according to the invention.

1. AutoLink functions. Several operations can be performed in relation to an AutoLink button other than selecting it for link and card creation. The user can create and edit an AutoLink button or can request an operation such as copy, move or delete on an existing button.

a. AutoLink Creation and Editing. FIG. 6 shows steps in creating and editing an AutoLink button. The first few steps, in boxes 200, 202 and 204, occur whenever the user makes a selection within a card displayed by the NoteCard system. The selection is received in box 200 and the card in which it occurred is identified in box 202. The step in box 204 is a branch that depends on the part of that card in which the selection occurred. FIG. 6 shows what happens if the user selects "Insert AutoLink" in a menu or selects an AutoLink button, but if the user selects another item, the selection is handled in box 206 as appropriate.

The "Insert AutoLink" option can be available in a middle button title bar menu of each card that can include an AutoLink button. Or it can be available in any other appropriate way. In any case, the test in box 210 determines whether, when the user selects "Insert AutoLink," the current selection is within the appropriate card at a place where an AutoLink button can be inserted. For example, using the types of cards provided in NoteCards, the invention could be implemented so that AutoLinks can only be inserted into Text cards, so that the selection must be within the text of the card into which the AutoLink button is to be inserted; or the implementation could allow AutoLinks only in Text or Sketch cards, and so forth. If the card that includes the selection is not an appropriate card for insertion of an AutoLink, an error message is provided to the user in box 212 and the system awaits further user signals.

If the current selection is in an appropriate card, the step in box 214 creates an AutoLink data unit with default values. The step in box 216 then displays a corresponding AutoLink button at the current selection. The newly created AutoLink data unit is included in the card's data unit so that when the user selects the Auto-Link button, the AutoLink data unit will be accessed to perform the operation requested by the user.

The implementation shown in FIG. 6 thus permits only AutoLinks whose source is local, as opposed to global. As currently implemented, NoteCards only permits links with global destinations, so that an AutoLink must have a local source and a global destination in the implementation of FIG. 6. This case is useful because it permits linking from within the text of a Text card to any other type of card. Although this may be the most useful case, the invention could in principal be used for the creation of any link of any classification, whether local to local, local to global, global to local, global to global, or any other variation.

FIG. 6 also shows the steps taken when the user selects the AutoLink button. The test in box 220 determines whether the selection is with the left or middle mouse button. The left mouse button is used to request link and card creation, and link and card creation in box 222 is described in detail below. The middle mouse button is used to request editing of the AutoLink button, so that if it is selected, a menu is displayed to permit the user to select either "New Link Values" or "AutoLink Looks," resulting in the branch shown in box 224. This menu can be positioned so that it will default to "New Link Values" if the user makes down and up mouse clicks at the same location, by positioning the menu with the "New Link Values" entry covering the area of the AutoLink button.

If the user selects "New Link Values," the step in box 226 opens a menu edit window that shows the values in the AutoLink data unit. If the AutoLink data unit is newly created, these will be the default values described above. The edit window can be displayed attached to the top of the card that includes the AutoLink button. The user can interactively edit the contents of the edit window to change the values to whatever values are desired.

The following values are illustrative of the default parameters that can be included in the AutoLink data unit and can be edited in this manner: The default title of the destination card, which is used if the AutoLink is to a new card, can be changed by selecting "Default Title" and typing in the new title to the right of it. The link type of the link to be created can be changed by selecting "Link Type" to obtain a menu of link types and selecting the new type. The card type of a new destination card can be changed by selecting "Card Type" to obtain a menu of card types and selecting the new type. The location of the new link in relation to the AutoLink button can be changed by selecting any of a number of appropriate relations, such as "Before" the AutoLink button, "After" the AutoLink button, "End of Line" of previously created links, or any other relation, in a "New Link Location" field; "After" can be the default value. Whether the user is prompted for a title for a new card being created can be controlled by selecting "Yes" or "No" in a "Prompt for Title?" field; "No" can be the default value. Whether the new card is displayed open on the screen after creation can be controlled by selecting "Yes" or "No" in an "Open New Card?" field; "No" can be the default value. Whether a new card created with this AutoLink button should require filing in fileboxes, a NoteCards feature, can similarly be controlled in a "Require Filing?" field, with "No" the default value. Whether the new link icon replaces the AutoLink button, so that the AutoLink button is a one-shot button, can be controlled by selecting "Yes" or "No" in a "Replace Button?" field, with "No" the default value.

If the user instead selects "AutoLink Looks" in box 224, another menu is displayed giving the user a choice between "Edit Button Label" and "Edit Button Font," as shown in box 230. If the user selects "Edit Button Label," the step in box 232 prompts the user for a new title for the selected AutoLink button. The AutoLink button is immediately updated with the new title provided by the user, in box 234. Similarly, if the user selects "Edit Button Font," the step in box 236 prompt the user for the type, face, and size of the font. The title is immediately updated in box 236 so that it appears in the font indicated by the user.

Figure 7:
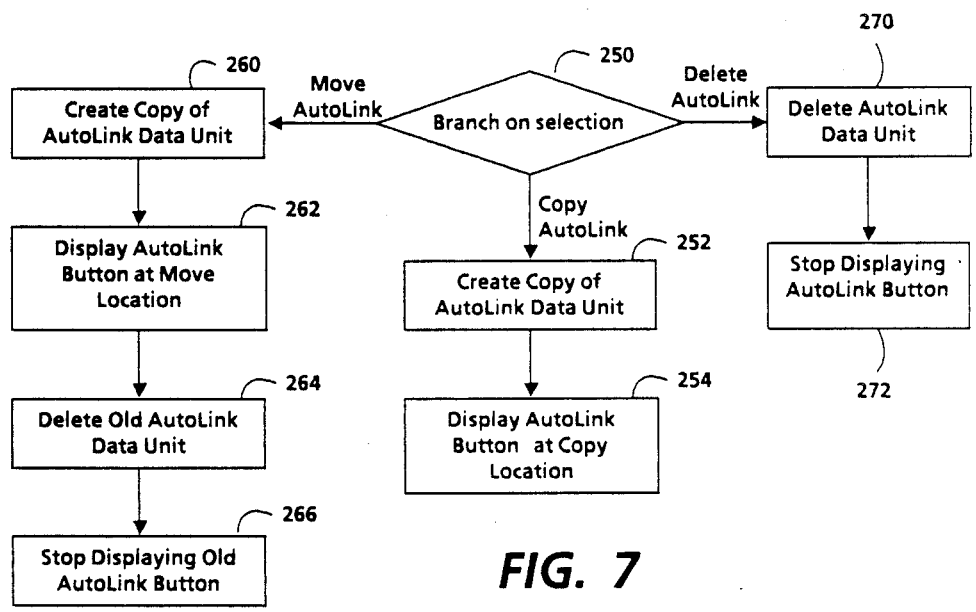
FIG. 7 is a flowchart of additional operations relating to a link creation data unit according to the invention.

The steps shown in FIG. 6 illustrate a current implementation, but many other approaches could be taken to AutoLink creation and editing. For example, whenever a new AutoLink is inserted, the system could request values from the user for the AutoLink data unit rather than using default values as described above.

b. Autolink Copying, Moving, and Deleting. FIG. 7 illustrates additional operations the user can request in relation to an existing AutoLink button. As in box 206 in FIG. 6, the branch in box 250 depends on a selection by the user. The options of copying, moving, and deleting an AutoLink can be presented in a title bar menu or in any other appropriate way.

When the user requests copying of an AutoLink, such as with a shift-select operation (i.e. mouse click selection of a copy location, then of the AutoLink button while the shift key is depressed), the step in box 252 determines which card corresponds to the selected location and, at the position in that card's data unit corresponding to the selected location, creates a copy of the AutoLink data unit corresponding to the selected AutoLink button. This new AutoLink data unit may be in the same card's data unit as the original or may be in the data unit corresponding to another card. Then, the step in box 254 displays an AutoLink button with the same appearance as the selected AutoLink button at the selected location, completing the copy operation.

When the user requests moving of an Autolink, such as with a shift-select operation (i.e. mouse click selection of a move location, then highlight selection of the AutoLink button while the shift key is depressed), the steps in boxes 260 and 262 do substantially the same operations as the steps in box 252 and 254, with the new AutoLink button displayed at the selected move location. Then, the step in box 264 deletes the old AutoLink data unit that has been copied, and the step in box 266 stops display of the corresponding AutoLink button, completing the move operation.

When the user requests deletion of an AutoLink, as by highlight selection delete or by selection and pushing the delete key, the step in box 270 deletes the corresponding AutoLink data unit from the card data unit that included it. The step in box 272 then stops display of the selected AutoLink button, completing the delete operation.

These operations add considerable power to the use of AutoLinks. The copy operation, in combination with templates, enables rapid production of a branch of linked cards. We turn now to discuss operations involving templates.

2. Template functions. In one implementation, as noted above, template cards are card types that can be included in an AutoLink data unit. Therefore, an instance of a template card can be created when an AutoLink data unit is selected for link and card creation. The parameters and contents used for a card's creation can be retrieved from card type list 110, in FIG. 4. Therefore, the operations involving template cards typically affect card type list 110 or an equivalent data structure that includes the parameters and contents necessary for card creation.

Templates are based on a facility of the NoteCards programmer's interface that enables the programmer to create a new card type by specializing an existing card type. Each card type inherits the properties of its parent in the card type hierarchy. For example, if its parent includes contents such as text, bitmaps, or graphic objects, those contents will also appear in the child card type. The programmer can tailor the NoteCards environment by adding card types particularly suited to the programmer's needs.

The template card facility was developed as an extension of NoteCards. It provides a menu interface by which a non-programming user can create new card types that are specializations of Text cards. Each of these new card types may include a template of contents that can be defined by the user, and a card that is an instance of one of these types will appear with the template of its type. The template card facility also provides a number of predefined template types that are available in a Template Definitions notefile.

A Template Definitions notefile provides definitions for templates and other card types within NoteCards. Although there can be more than one Template Definitions notefile available, a given user can have only one active Template Definitions notefile at a time. At the same time, however, the user could be working in more than one other notefile, in which case any template calls from any of the working notefiles would be interpreted according to the definitions in the active Template Definitions notefile. Therefore, only the card types of the currently active Template Definitions notefile are available to that user.

When the user attempts to open a card, the system will determine whether that card is of a type available in the user's currently active Template Definitions notefile, in which case an entry for that type will be included in that notefile's card type list, as discussed above in relation to card type list 110 in FIG. 4. Similarly, if a user attempts to create a new card through selecting the "NewCards" area in a notefile's icon, only the types available in the currently active Template Definitions notefile will be presented as options for the type of the new card. The user can also obtain a list of the template types in a notefile by obtaining the notefile icon's middle button menu, by selecting "Template Ops" to obtain an additional menu, and by selecting "Show defined templates" in the additional menu.

Figure 8:
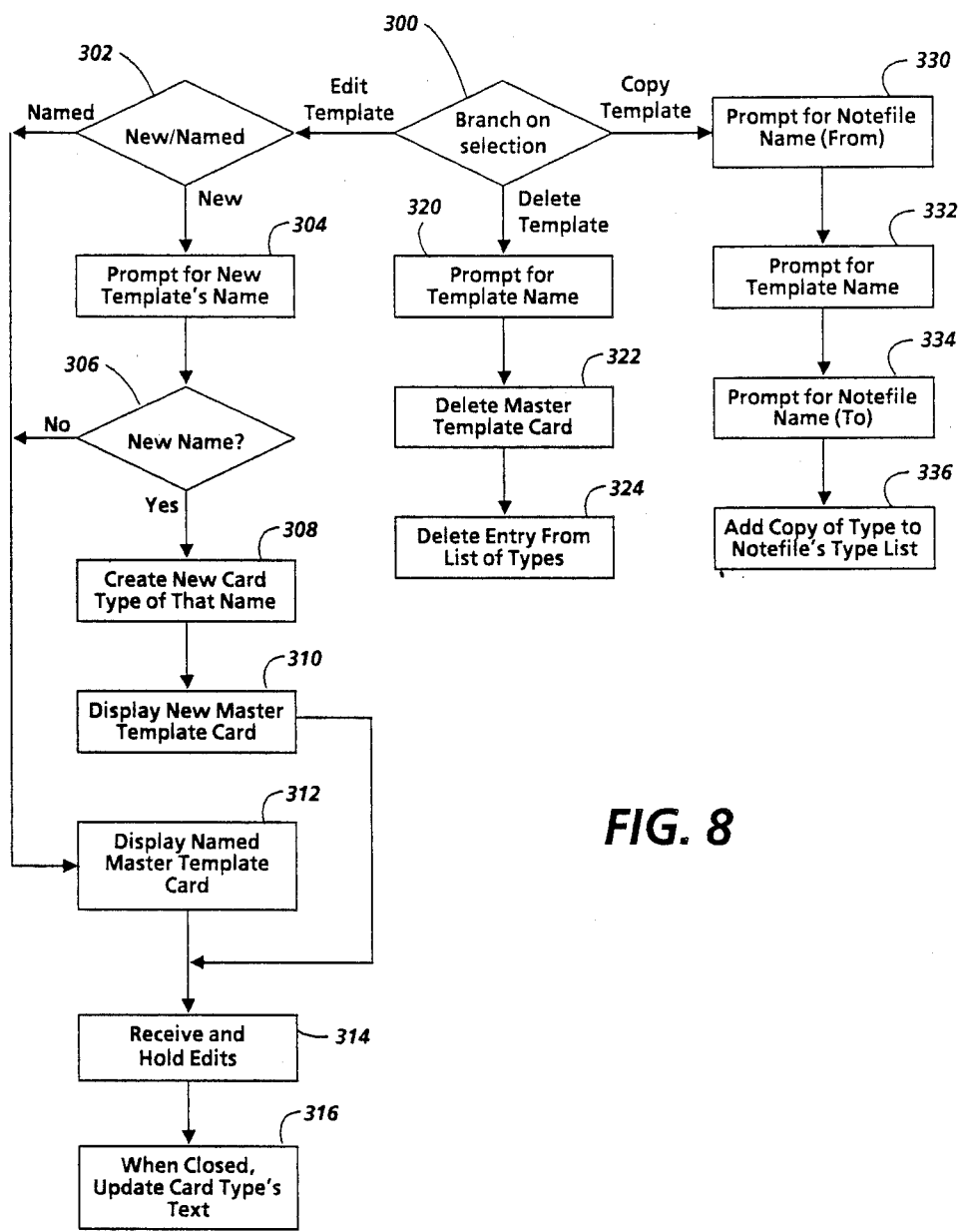
FIG. 8 is a flowchart of operations relating to a card creation data unit according to the invention.

FIG. 8 illustrates a number of template operations in one implementation. These operations are selected by first obtaining a Template Menu and then rolling out and expanding the "Template Operations" item on the Template Menu. The branch in box 300, similar to box 250 in FIG. 7 and box 204 in FIG. 6, depends on which of the three options in the expanded menu the user selects.

If the user selects "Edit Template," the step in box 302 displays a menu entitled "edit which template?" that includes all of the template types in the currently active notefile, together with an option for "—New Template—." If the user selects "—New Template—" on this menu, the system prompts the user for a name for the new template type, in box 304. The name entered by the user is compared with the existing template types in box 306, and if it is not the same as any of them, a new card type of that name is created and added to the currently active notefile's list of card types, in box 308. The step in box 310 then displays a special card for the new type called the master template card. The master template card enables the user to edit the parameters and contents of the new type. Similarly, if the user selected one of the named types on the menu or provided the name of an existing type, the step in box 312 displays the master template card for the named type. The step in box 314 then receives the edit operations requested by the user. These edits are generally held until the user closes the master template card. When the user closes the card, the step in box 316 updates the text and other card type parameters for that card type in the list of card types so that subsequent accesses of that card type will find the new text.

The master template card looks very similar to the cards of the type it is used to define. The user can edit a number of features of the card type through the master template card, and most of these features affect the appearance of each new card of that type. The features that affect appearance include the text of the new card; the new card's screen region; the new card's title; the icon bitmap identifier associated with the card type; and the link display mode associated with the card type.

To edit the new card's text, the user can edit the text in the master template card. The text is edited with the standard Lisp text editor TEdit, mentioned above in relation to Lisp 172 in FIG. 5. As noted above, the changes made by editing text only take effect when the master template card is closed.

The user can edit the new card's screen region by prespecifying the size of each newly created card and where on the screen it will appear when created. This is done using a "Card Management" facility to set the master template card's region as for any other card. Using this facility, the user selects "Lock" to store the card's current size and position, so that the next time the card is displayed, it appears at that size and position despite intervening operations. If the master template card is locked in this way, all new cards based on that master template appear at that size and position, so that each new card inherits the region of the master template card. The "Card Management" facility is invoked through a card's middle button title bar menu, and the parameters it modifies during editing of a master template card are included in the entry of the corresponding card type in the list of card types.

To edit the new card's title, the user first selects an item "Edit Property List" on the middle button title bar menu of the master template card. This produces an editing window entitled "Edit Property List" that includes a field entitled "NewCardTitle." The user can then edit the contents of the "NewCardTitle" field to change the default title for each new card of that type.

To edit the card type's icon bitmap identifier, an icon that appears on the left of link icons leading to that card type, the user first selects an item "Edit Icon Bitmap" on the middle button title bar menu of the master template card. This starts the standard Lisp bitmap editor operating on the icon bitmap for this card type. When the editing session is completed by selecting "OK" in the middle button menu of the bitmap editor's window, this card type's icon is updated with the changes made to the bitmap. The editing session can be aborted by selecting the menu item "Stop." While the bitmap editor is operating, the user cannot perform other editing operations on the master template card. The user can also rollout on the item "Edit Icon Bitmap" to obtain the item "Load icon from file," in which case a prompt is given for the name of a special icon-bitmap file containing previously developed icons. The icon bitmap is loaded from the file before the bitmap editor is started, and the user can then edit the loaded bitmap.

To edit the card type's link display mode, the user first selects an item "Edit Link Display Mode" on the middle button title bar menu of the master template card. In response, a menu entitled "Display Mode for Card Type?" is displayed, allowing the user to edit the display mode for link icons appearing in cards of this type. For example, the link display mode can display any combination of three fields: the icon bitmap card type identifier for the destination card; the label of the link; and the title of the destination card. Each of these fields can be assigned a value of Yes, No, or Float, as described at page 75 of the NoteCards Manual. The default value for each field is Float. These values determine what is included in each link icon that occurs in cards of that type, i.e. when that card is the source of the link.

As shown in FIG. 8, if the user selects "Delete Template" under "Template Operations" on the Template Menu, the step in box 320 prompts the user for the name of the template to be deleted. In box 322, the master template card for that template is deleted from the currently active Template Definitions notefile. In box 324, the entry for that type is deleted from the notefile's list of card types, so that the type becomes undefined for that notefile. Existing cards of that type therefore can no longer be accessed, until either the deleted template type's name is redefined in the currently active Template Definitions notefile or each card's associated template type is changed to an available card type.

Another way to delete a template is to select "Delete Card" in the left button title bar menu for the master template card, which is the standard way to delete any notecard. This leads directly to the steps in boxes 322 and 324, since the template name is specified if the master template card is selected.

Finally, if the user selects "Copy Template" under "Template Operations" on the Template Menu, the step in box 330 prompts the user for the name of a notefile from which to copy a template. The step in box 332 then prompts the user for the name of the template to be copied. Then, the step in box 334 prompts the user for the name of the notefile into which it is to be copied. The step in box 336 then adds a copy of that template's entry in the list of card types of the notefile it is in to the list of card types of the notefile into which it is to be copied.

When the necessary data for link and card creation has been provided by AutoLink creation and editing and by template creation and editing, an AutoLink button can be successfuly selected for link and card creation. We turn now to the details of link and card creation.

Figure 9:
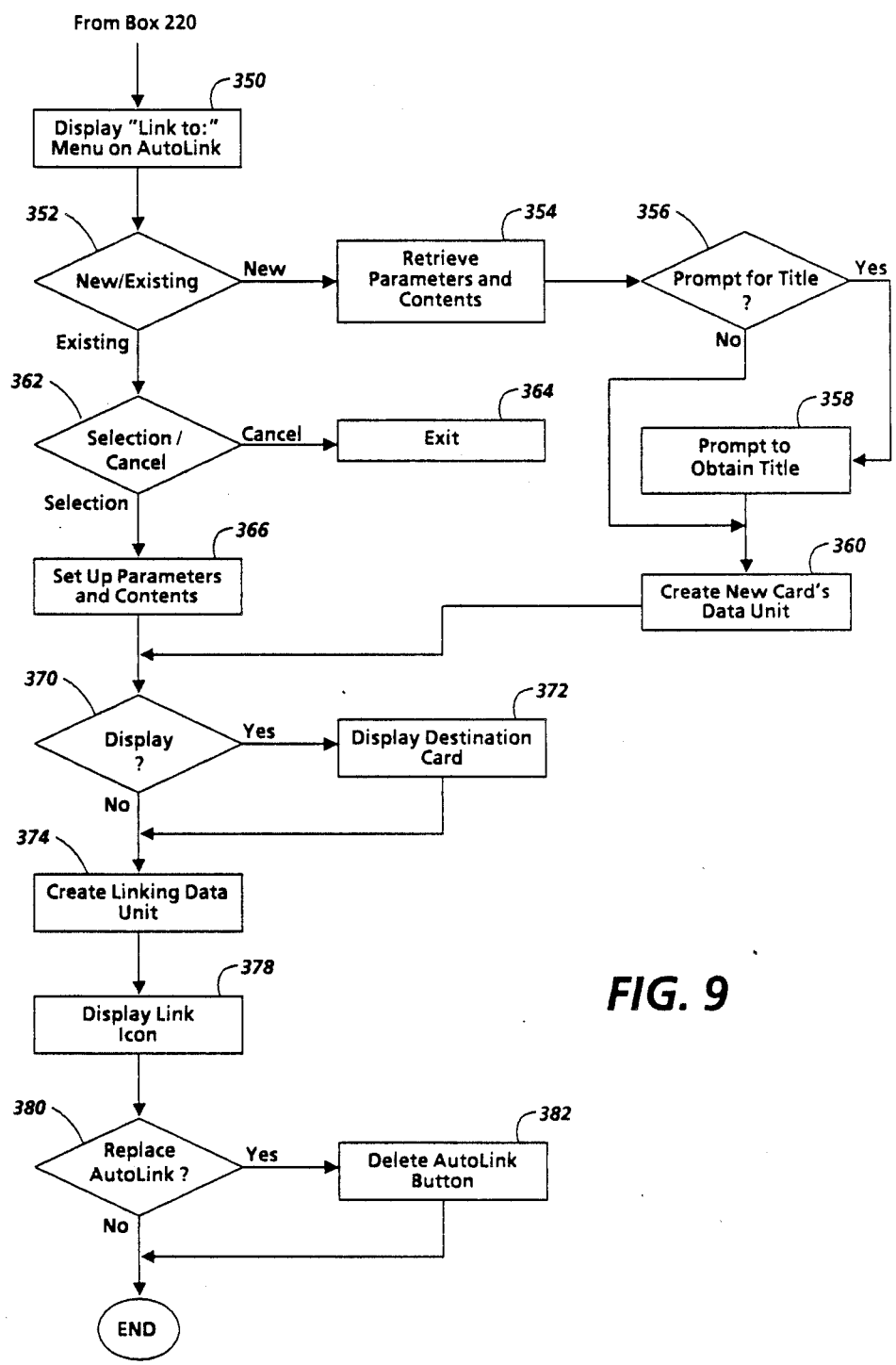
FIG. 9 is a flowchart of single level link and card creation according to the invention.

3. Link and Card Creation. The functions described above lay the necessary groundwork for accelerated link and card creation in accordance with the invention. They do so by providing the necessary data so that card data units and linking data units can be created when the user selects an AutoLink button. In response to a user selection, a single link and its destination card can be created, or several levels of links can be created.

a. Single Level Link and Card Creation. FIG. 9 illustrates single level link and card creation, resulting in the creation of a new destination card's data unit and a linking data unit linking it to a source card that includes the selected AutoLink button. The preliminary steps leading to FIG. 9 are shown in FIG. 6, discussed above. When the user selects the AutoLink button with the left mouse button, link and card creation begins.

Figure 10:
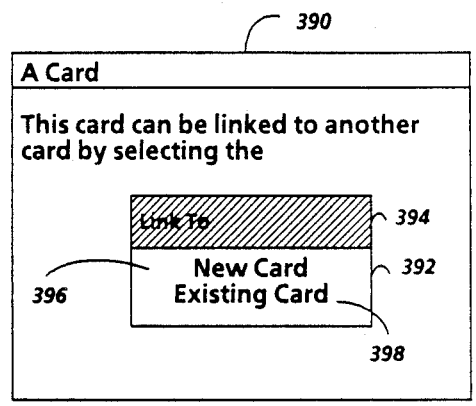
FIG. 10 is a schematic view of a card illustrating a menu by which the user can select creation of a link to a new card or an existing card.

The step in box 350 displays a "Link to:" menu to the user. This menu is superimposed on the selected AutoLink button as illustrated in FIG. 10. Card 390 in FIG. 10 is substantially the same as card 10 in FIG. 1A, except that the AutoLink button has been selected with a down click of the left mouse button. Superimposed on card 390 is menu 392, with its title 394 above the area of the AutoLink button and with menu item 396 entitled "New Card" covering the area of the AutoLink button. If the user immediately permits an up click of the left mouse button, this item will be selected. A quick down and up click to select the AutoLink button will thus begin creation of a new card and a link to it even if done so quickly that the user never sees the display of menu 392. On the other hand, if the user moves the mouse to select menu item 398 with the up click of the left mouse button, creation of a link to an existing card begins.

The test in box 352 thus determines whether a new card should be created and linked or whether a link to an existing card should be created. If a new card is to be created, the step in box 354 retrieves the parameters and contents of the new card. This step is performed by accessing the AutoLink data unit to obtain the card type of the destination card. This card type is then used to access the corresponding entry in the list of card types for the currently active notefile.

The test in box 356 determines whether the parameters of the card type indicate that the user should be prompted for the new card's title. If so, the user is prompted to obtain the title, in box 358. The step in box 360 then creates the new card's data unit. As discussed above, this includes setting up a hash table entry for the new card as well as constructing the data unit itself. The data unit includes the parameters and contents of the card's type, including the title and a value indicating whether the new card should be displayed.

If a link to an existing card is to be created, the test in box 362 determines whether the user has selected an existing card as the destination or, on the other hand, has selected to cancel the operation. If cancellation is selected, the step in box 364 exits. But if an existing card is selected, the step in box 366 sets up its parameters and contents as necessary in preparation for linking.

The test in box 370 determines whether the destination card, whether new or existing, should be displayed. In either case, this can be based on the value in the card's type indicating whether to display it. If so, the step in box 372 displays it.

The step in box 374 creates the linking data unit based on the parameters available. As with creation of a card data unit, this step includes setting up a hash table entry for the new link as well as constructing the data unit itself. The type of the link is determined from the AutoLink data unit. If linking to an existing card, the link can be to a card of any card type, but if to a new card, the card type will be the type specified by the AutoLink data unit, as described above. Then, the step in box 378 displays the link icon in accordance with the parameters, including the bitmap indicator and the appropriate fields indicated by the link display mode, and in the position indicated by the new link location. In this step, the new card's title specified in the AutoLink data unit overrides the default title in the entry in the card type list from the master template card. The test in box 380 determines whether the parameters indicate that the AutoLink button should be replaced. If so, it is deleted in box 382 before ending link and card creation.

Figure 11:
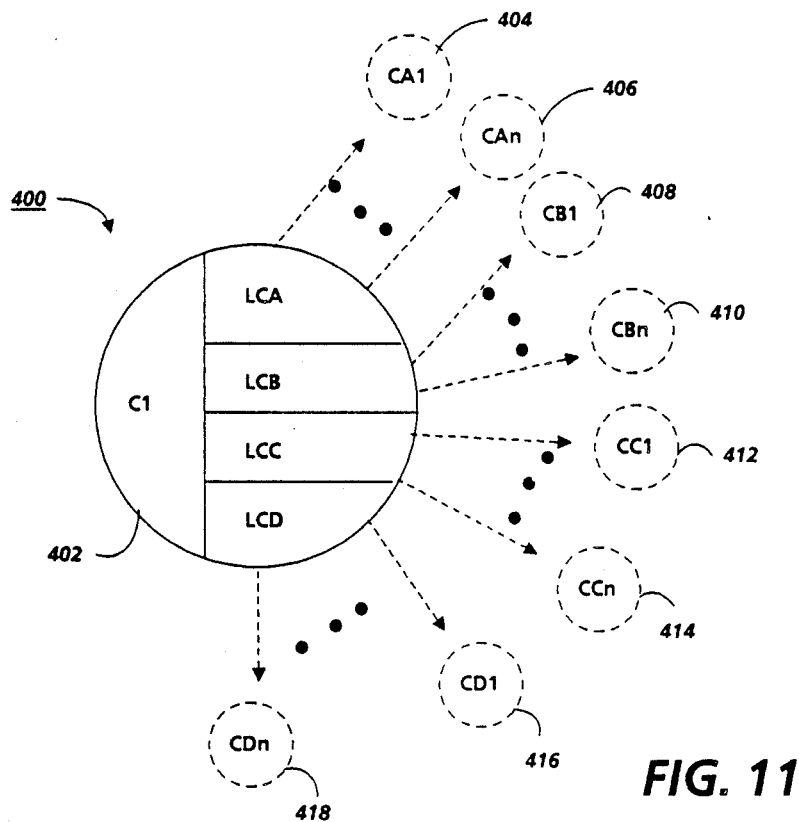
FIG. 11 is a schematic representation of a workspace network that could be created by repeated selection of a number of link creation units according to the invention.

The steps shown in FIG. 9 can be performed repeatedly in response to repeated selection of an AutoLink button, as discussed above in relation to FIG. 3. Furthermore, since a given card can contain more than one AutoLink button, a more complicated set of links can be created from a given card by selecting each of the AutoLink buttons it contains a number of times. FIG. 11 illustrates network 400 that could be created in this manner starting with card data unit C1 represented by circle 402. In response to selection of the AutoLink button corresponding to link creation data unit LCA, a set of card data units CA1-CAn corresponding to circles 404 and 406 would be created and linked to card C1. Similarly, link creation data units LCB, LCC and LCD would be accessed to create and link card data units CB1-CBn corresponding to circles 408 and 410, CC1-CCn corresponding to circles 412 and 414, and CD1-CDn corresponding to circles 416 and 418.

Although a network can be rapidly created in this manner, the use of AutoLink buttons is an optional alternative to the previous techniques for link creation, so that the freedom of the user in creating a network is not limited. The availability of a technique for rapid link and card creation may, however, encourage the user to use the AutoLink buttons rather than the more cumbersome link creation techniques available previously.

Figure 12:
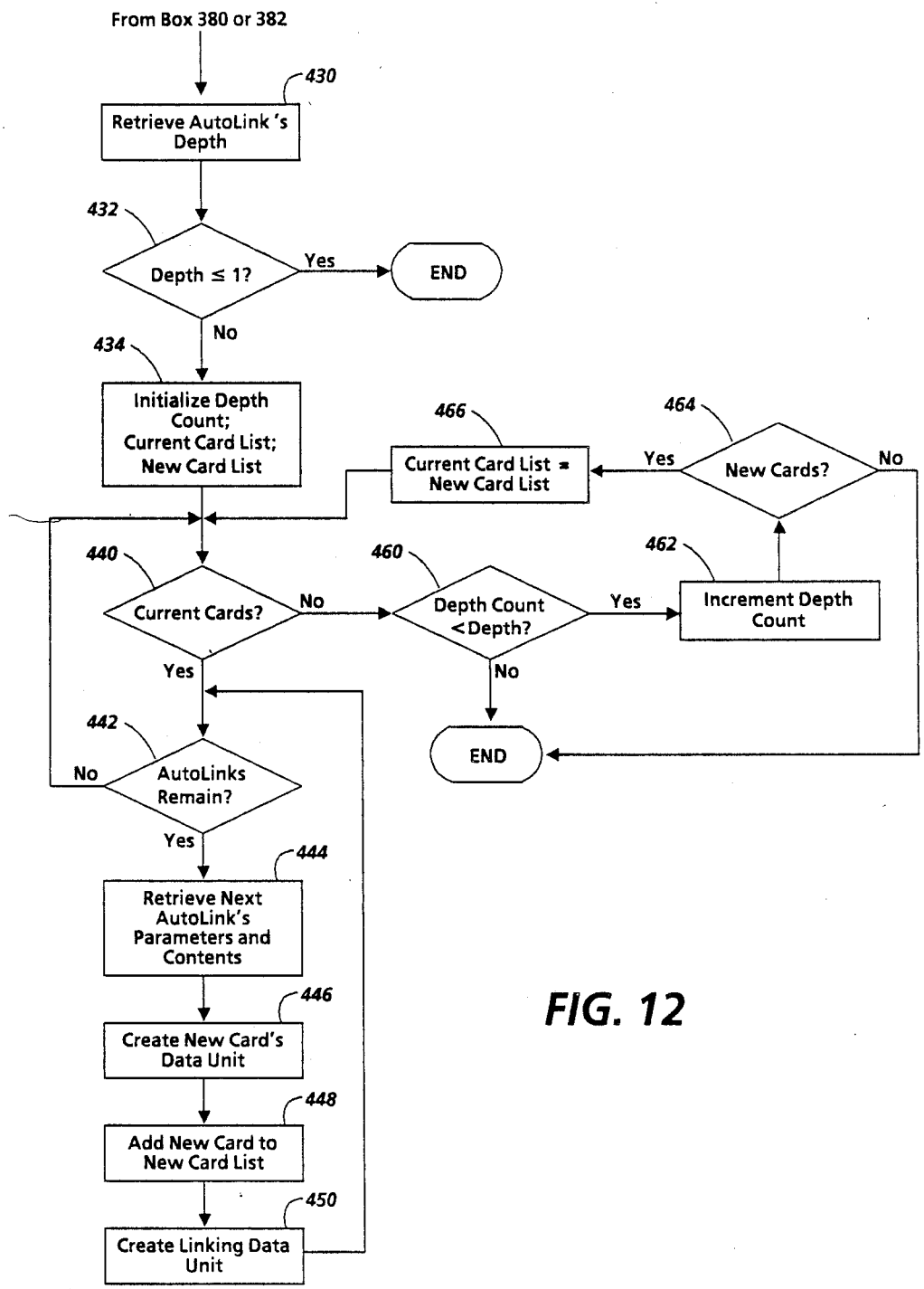
FIG. 12 is a flowchart of multi-level link and card creation according to the invention.

The single level link and card creation technique described above can be readily extended to a multi-level technique.

b. Multi-level Link and Card Creation. FIG. 12 illustrates a modification of the technique of FIG. 9 to permit multi-level link and card creation. This modification depends on an additional parameter in the AutoLink data unit, called Depth, indicating the number of levels of links and cards to be created when the corresponding AutoLink button is selected. In addition, the technique of FIG. 12 assumes that none of the cards to be created require a prompt to the user for a title and that none of the cards must be displayed. Therefore, the card's data units can be created rapidly without any interaction with the user.

The technique of FIG. 12 begins after the step in box 380 or 382 in FIG. 9, at which point the first linking data unit and the first new card data unit have been created. The step in box 430 retrieves the Depth parameter of the AutoLink data unit corresponding to the selected AutoLink button. The test in box 432 compares Depth with the integer one. If Depth is less than or equal to one, the technique ends, because multi-level link and card creation is unnecessary.

Multi-level creation continues by initializing in box 434. A variable DepthCount is initialized to one. A CurrentCard list and a NewCard list are set up. The CurrentCard list is initially set to include only the newly created card data unit, while the NewCard list is initially empty.

The test in box 440 begins an iterative loop for each card on the CurrentCard list. For the next card on the list, the test in box 442 determines whether it includes any AutoLinks. If so, the step in box 444 takes the next AutoLink in that card and retrieves its parameters and contents as necessary for creation of a new card data unit and a linking data unit. This will include accessing the card type of the AutoLink's destination card to retrieve its parameters and contents. The new card's data unit is then created in box 446, and the new card is added to the NewCard list in box 448. The step in box 450 creates a linking data unit linking the new card to the source card, completing creation of one card and link. The steps in boxes 444–450 do not include handling the Depth parameter of the AutoLink, because only the Depth parameter of the originally selected AutoLink is used in multi-level link and card creation—the Depth parameters of other AutoLinks are overridden.

When the test in box 442 determines that the last AutoLink in a card has been handled, the routine of FIG. 12 returns to the test in box 440 to determine whether the CurrentCard list includes further cards. When no further cards remain on the CurrentCard list, the routine of FIG. 12 has completed a level of link and card creation and can proceed to the next level.

The test in box 460 determines whether the current DepthCount is less than the Depth parameter. If so, the DepthCount is incremented in box 462. The test in box 464 then determines whether the NewCard list includes any cards. If not, or if the current DepthCount has reached the Depth parameter, all the levels called for by the Depth parameter have been created, so the routine ends. But if further levels remain to be created and there is at least one card on the NewCard list, the routine sets the CurrentCard list to be the NewCard list in box 466, then clears the NewCard list before returning to the iterative loop that begins with the test in box 440 for the next level.

Multi-level link creation saves a tremendous amount of user effort by creating an entire branch of cards and links. The user can then access the cards as appropriate by successively selecting link icons.

D. Miscellaneous

Many other modifications, variations, extensions and alternative implementations of the invention will now be apparent to one skilled in the art. For example, each AutoLink data unit could include a parameter indicating the number of links to be created when the corresponding AutoLink button is selected. Upon selection of an AutoLink button with this parameter greater than one, a number of identical new cards would be created, each linked to the source card through an equal number of new link icons. Another variation would be for an AutoLink data unit to capable of specifying an existing card or a new card's type. If an AutoLink accordingly creates one or more links to an existing card, it would function very much like an ordinary link in the view of the user and its AutoLink data unit would in effect include a linking data unit to the destination card; selection of the AutoLink button would be necessary, however, for creation of the complete linking data units. Additional variations could include providing different user interfaces for storing data for link creation, including technique that would permit the user to preview the links and cards that would be created in response to an AutoLink selection.

An implementation of the invention has been included in the Instructional Design Environment (IDE), an interactive design and development system, as described in Jensen, A-M .S., Jordan, D. S., and Russell, D. M., "The IDE System for Creating Instruction," a paper presented at Applications of Artificial Intelligence and CD-ROM in Education and Training Conference, Arlington, VA, Oct. 1987, incorporated herein by reference. IDE itself was earlier described in a talk at the workshop on "Intelligent Tutoring Systems: Lessons Learned," Smugglers Notch, Vt., Oct. 1986, with papers based on the talk to be published in Psotka, J., L.

D. Massey, and Mutter, S.A. (Eds.), *Intelligent Tutoring Systems: Lessons Learned*, Lawrence Erlbaum Associates, Inc., Hillsdale, N.J., 1988, also incorporated herein by reference.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A method of operating a system that includes a display and an input device for receiving signals from a user; the method comprising the steps of:

presenting on the display a first workspace; the first workspace including a first set of display features, each display feature in the first set having a respective position within the first workspace; the first set of display features including a selectable link creation unit; the selectable link creation unit including a first bounded area of the display at the selectable link creation unit's respective position within the first workspace; the signals from the user including a first signal indicating a position within the first bounded area;

upon receiving from the input device the first signal, presenting on the display at a respective position within the first workspace a selectable linking unit indicating a link to a second workspace; the selectable linking unit including a second bounded area of the display at the selectable linking unit's respective position within the first workspace; the step of presenting the selectable linking unit including a substep of accessing location data indicating a relation between the selectable link creation unit's respective position and the selectable linking unit's respective position and using the location data to obtain the selectable linking unit's respective position; the signals from the user including a second signal indicating a position within the second bounded area; and upon receiving from the input device the second signal, presenting on the display the second workspace, the second workspace including a second set of display features, each display feature in the second set having a respective position within the second workspace.

2. The method of claim 1 in which the step of presenting the selectable linking unit comprises a substep of presenting an icon in the second bounded area of the display.

3. The method of claim 1 in which the first set of display features includes a sequence of display features, the first bounded area of the display and the second bounded area of the display each including a respective one of the sequence of display features, the step of presenting the selectable linking unit further comprising a substep of presenting the selectable linking unit so that the respective display feature of the second bounded area is positioned immediately after the respective display feature of the first bounded area in the sequence.

4. The method of claim 1 in which the first set of display features includes a sequence of text, the step of presenting the first workspace comprising presenting the selectable link creation unit within the text sequence in the first workspace.

5. The method of claim 1 in which the step of presenting the selectable linking unit comprises ceasing to present the selectable link creation unit, the second bounded area of the display including a part of the first bounded area of the display.

6. The method of claim 1 in which each of the first and second workspaces is a card.

7. A method of operating a system that includes a display, an input device for receiving signals from a user, and a workspace network data structure that can be accessed for presenting workspaces on the display; the workspace network data structure including a first workspace data unit relating to a first workspace that can be presented on the display, the first workspace including a first set of display features, each display feature in the first set having a respective position within the first workspace; the first set of display features including a selectable link creation unit, the selectable link creation unit including a first bounded area of the display at the selectable link creation unit's respective position within the first workspace; the signals from the user including a first signal indicating a position within the first bounded area; the workspace network data structure including a link creation data unit that can be accessed after accessing the first workspace data unit; the link creation data unit including link creation data for creating in the workspace network data structure a linking data unit linking the first workspace data unit and a second workspace data unit relating to a second workspace; the link creation data including location data indicating a relation between the selectable link creation unit's respective position and a selectable linking unit's respective position within the first workspace; the method comprising steps of:

accessing the first workspace data unit and presenting the first workspace on the display, the first workspace including the selectable link creation unit; and upon receiving the first signal, presenting the selectable linking unit at its respective position within the first workspace; the step of presenting the selectable linking unit comprising substeps of:

accessing the link creation data unit;

using the link creation data to create the linking data unit in the workspace network data structure; and using the location data to obtain the selectable linking unit's respective position within the first workspace.

8. The method of claim 7 in which the first workspace is a first card and the second workspace is a second card, the link creation data including an identifier of the second card.

9. The method of claim 7 in which the selectable linking unit includes a second bounded area of the display at the selectable linking unit's respective position within the first workspace; the signals from the user including a second signal indicating a position within the second bounded area; the method further comprising a step of presenting the second workspace on the display upon receiving the second signal from the input device, the second workspace including a second set of display features, each display feature in the second set having a respective position within the second workspace.

10. The method of claim 9 in which the first workspace includes a sequence of text; the selectable link creation unit being within the text sequence, the location data indicating the location of the second bounded area relative to the first bounded area in the text sequence.

11. The method of claim 10 in which the location data indicate the location of the second bounded area as immediately after the first bounded area, the step of presenting the selectable linking unit comprising a substep of presenting the selectable linking unit with the second bounded area positioned immediately after the first bounded area in the text sequence.

12. The method of claim 7, further comprising the steps of:
prior to receiving the first signal, including a workspace creation data unit in the workspace network data structure, the workspace creation data unit being accessible after accessing the first workspace data unit, the workspace creation data unit including workspace creation data for creating in the workspace network data structure the second workspace data unit; and
upon receiving the first signal, accessing the workspace creation data unit and using the workspace creation data to create the second workspace data unit in the workspace network data structure.

13. A workspace network data structure for use in a system that includes:
a display;
an input device for receiving signals from a user; and
control means for receiving the signals from the input means, for accessing the workspace network data structure, and for controlling the display;
the workspace network data structure comprising:
a first workspace data unit relating to a first workspace; the first workspace data unit being accessible by the control means for use in presenting the first workspace on the display; the first workspace including a first set of display features, each display feature in the first set having a respective position within the first workspace; the first set of display features including a selectable link creation unit, the selectable link creation unit including a first bounded area of the display at the selectable link creation unit's respective position within the first workspace; the signals from the user including a first signal indicating a position within the first bounded area; and
a link creation data unit that is accessible by the control means when the control means has accessed the first workspace data unit, the link creation data unit including link creation data for use by the control means in responding to the first signal by creating in the workspace network data structure a linking data unit linking the first workspace data unit and a second workspace data unit relating to a second workspace; the second workspace including a second set of display features, each display feature in the second set having a respective position within the second workspace; the link creation data including location data indicating a relation between the selectable link creation unit's respective position and a selectable linking unit's respective position within the first workspace; the location data being for use by the control means in responding to the first signal by presenting the selectable linking unit at its respective position within the first workspace; the second workspace data unit being accessible by the control means for use in presenting the second workspace on the display.

14. The workspace network data structure of claim 13, further comprising a workspace creation data unit that is accessible by the control means when the control means has accessed the first workspace data unit, the workspace creation data unit including workspace creation data for use by the control means in responding to the first signal by creating the second workspace data unit in the workspace network data structure.

15. The data structure of claim 14, further comprising a sequence of link and workspace creation data units, the data units in the sequence being accessible by the control means when the control means has accessed the first workspace data unit, the sequence beginning with the first above-mentioned link creation data unit and workspace creation data unit and including at least one additional link creation data unit, each additional link creation data unit including link creation data for use by the control means in creating in the workspace network data structure an additional linking data unit, each additional linking data unit linking the second workspace data unit and a respective additional workspace data unit relating to a respective additional workspace; each respective additional workspace data unit being accessible by the control means for use in presenting the respective additional workspace on the display; each respective additional workspace including a respective set of display features, each display feature in each additional workspace's respective set having a respective position within the additional workspace.

16. The workspace network data structure of claim 15 in which each of the additional link creation data units includes link creation data for use by the control means in creating a plurality of the additional linking data units.

17. The workspace network data structure of claim 13 in which the first workspace is a first card and the second workspace is a second card, the link creation data in the link creation data unit including an identifier of the second card.

18. A method of using a workspace network data structure in a system that includes:
a display;
an input device for receiving signals from a user; and
control means for receiving the signals from the input means, for accessing the workspace network data structure, and for controlling the display;
the workspace network data structure including:
a first workspace data unit relating to a first workspace; the first workspace data unit being accessible by the control means for use in presenting the first workspace on the display; the first workspace including a first set of display features, each display feature in the first set having a respective position within the first workspace; the first set of display features including a selectable link creation unit, the selectable link creation unit including a first bounded area of the display at the selectable link creation unit's respective position within the first workspace; the signals from the user including a first signal indicating a position within the first bounded area;
a workspace creation data unit that is accessible by the control means when the control means has accessed the first workspace data unit, the workspace creation data unit including workspace creation data fur use by the control means in responding to the first signal by creating a second workspace data unit in the workspace network data structure; the second workspace data unit relating to a second workspace; the second workspace including a second set of display features, each display feature in the second set having a respective position within the second workspace; the second workspace data unit being accessible by the control means for use in presenting the second workspace on the display; and a link creation data unit that is accessible by the control means when the control means has accessed the first workspace data unit, the link creation data unit including link creation data for use by the control means in responding to the first signal by creating in the workspace network data structure a linking data unit linking the first workspace data unit and the second workspace data unit; the link creation data including location data indicating a relation between the selectable link creation unit's respective position and a selectable linking unit's respective position within the first workspace; the location data being for use by the control means in responding to the first signal by presenting the selectable linking unit at its respective position within the first workspace;

the method comprising steps of:

accessing the first workspace data unit and presenting the first workspace on the display;

in response to the first signal, accessing the workspace creation data unit and using the workspace creation data to create the second workspace data unit; and in response to the first signal, accessing the link creation data unit and using the link creation data to create the linking data unit.

19. A method of using a workspace network data structure in a system that includes:

a display;

an input device for receiving signals from a user; and control means for receiving the signals from the input means, for accessing the workspace network data structure, and for controlling the display;

the workspace network data structure including:

a first workspace data unit relating to a first workspace; the first workspace data unit being accessible by the control means for use in presenting the first workspace on the display; the first workspace including a first set of display features, each display feature in the first set having a respective position within the first workspace; the first set of display features including a selectable link creation unit, the selectable link creation unit including a first bounded area of the display at the selectable link creation unit's respective position within the first workspace; the signals from the user including a first signal indicating a position within the first bounded area;

a sequence of link and workspace creation data units, the data units in the sequence being accessible by the control means when the control means has accessed the first workspace data unit, the sequence beginning with a first link creation data unit and a first workspace creation data unit;

the first workspace creation data unit including respective workspace creation data for use by the control means in responding to the first signal by creating a second workspace data unit in the workspace network data structure; the second workspace data unit relating to a second workspace;

the second workspace including a second set of display features, each display feature in the second set having a respective position within the second workspace; the second workspace data unit being accessible by the control means for use in presenting the second workspace on the display;

the first link creation data unit including respective link creation data for use by the control means in responding to the first signal by creating in the workspace network data structure a respective linking data unit linking the first workspace data unit and the second workspace data unit; the link creation data including location data indicating a relation between the selectable link creation unit's respective position and a selectable linking unit's respective position within the first workspace; the location data being for use by the control means in responding to the first signal by presenting the selectable linking unit at its respective position within the first workspace; the sequence of link and workspace creation data units including at least one additional link creation data unit, each additional link creation data unit including link creation data for use by the control means in creating in the workspace network data structure a respective additional linking data unit, each respective additional linking data unit linking the second workspace data unit and a respective additional workspace data unit relating to a respective additional workspace; each respective additional workspace data unit being accessible by the control means for use in presenting the respective additional workspace on the display; each respective additional workspace including a respective set of display features, each display feature in each additional workspace's respective set having a respective position within the additional workspace the method comprising steps of:

accessing the first workspace data unit and presenting the first workspace on the display; the fist workspace including the selectable link creation unit; the selectable link creation unit including the first bounded area of the display; and upon receiving the first signal, accessing the link and workspace creation data units in the sequence, using the respective link creation data in the first link creation data unit to create the respective linking data unit, using the respective workspace creation data in the first workspace creation data unit to create the second workspace data unit, and accessing the second workspace data unit and presenting on the display the second workspace, the second workspace including a respective selectable link creation unit for each additional link creation data unit; each respective selectable link creation unit including a respective bounded area of the display.

20. The method of claim 19 in which the workspace network data structure further comprises a third workspace data unit relating to a third workspace, the third workspace data unit being accessible by the control means for use in presenting the third workspace on the display; the third workspace including a third set of display features, each display feature in the third set having a respective position within the third workspace; the signals from the user including a copy signal requesting a copy operation on the selectable link creation unit in relation to the third workspace data unit;

the method further comprising, upon receiving the copy signal, including a copy of the first link creation data unit in the workspace network data structure, the copy being accessible by the control means when it has accessed the third workspace data unit.

21. A method of using a workspace network data structure in a system that includes:
   a display;
   an input device for receiving signals from a user; and
   control means for receiving the signals from the input means, for accessing the workspace network data structure, and for controlling the display;
   the workspace network data structure including:
   a first workspace data unit relating to a first workspace; the first workspace data unit being accessible by the control means for use in presenting the first workspace on the display; the first workspace including a first set of display features, each display feature in the first set having a respective position within the first workspace; the first set of display features including a selectable link creation unit, the selectable link creation unit including a first bounded area of the display at the selectable link creation unit's respective position within the first workspace; the signals from the user including a first signal indicating a position within the first bounded area;
   a sequence of link and workspace creation data units, the data units in the sequence being accessible by the control means when the control means has accessed the first workspace data unit, the sequence beginning with a first link creation data unit and a first workspace creation data unit;
   the first workspace creation data unit including respective workspace creation data for use by the control means in responding to the first signal by creating a second workspace data unit in the workspace network data structure; the second workspace data unit relating to a second workspace; the second workspace including a second set of display features, each display feature in the second set having a respective position within the second workspace; the second workspace data unit being accessible by the control means for use in presenting the second workspace on the display;
   the first link creation data unit including respective link creation data for use by the control means in responding to the first signal by creating in the workspace network data structure a respective linking data unit linking the first workspace data unit and the second workspace data unit; the link creation data including location data indicating a relation between the selectable link creation unit's respective position and a selectable linking unit's respective position within the first workspace; the location data being for use by the control means in responding to the first signal by presenting the selectable linking unit at its respective position within the first workspace;
   the sequence of link and workspace creation data units including at least one additional link creation data unit, each additional link creation data unit including link creation data for use by the control means in creating in the workspace network data structure a respective additional linking data unit, each respective additional linking data unit linking the second workspace data unit and a respective additional workspace data unit relating to a respective additional workspace; each respective additional workspace data unit being accessible by the control means for use in presenting the respective additional workspace on the display; each respective additional workspace including a respective set of display features, each display feature in each additional workspace's respective set having a respective position within the additional workspace;
   the sequence of link and workspace creation data units including a plurality of levels of link creation data units, the first link creation data unit being included in a first one of the levels, the link creation data in the first link creation data unit including level number data including a number of levels;
   the method comprising steps of:
   accessing the first link creation data unit to retrieve the level number data; and
   creating in the workspace network data structure the number of levels of linking data units and workspace data units indicated by the level number data.

22. A method of using a workspace network data structure in a system that includes:
   a display;
   an input device for receiving signals from a user; and
   control means for receiving the signals from the input means, for accessing the workspace network data structure, and for controlling the display;
   the workspace networkd data structure including:
   a first workspace data unit relating to a first workspace; the first workspace data unit being accessible by the control means for use in presenting the first workspace on the dispaly; the first workspace including a first set of display features, each display feature in the first set having a respective position within the first workspace; the first set of display features including a selectable link creation unit, the selectable link creation unit including a first bounded area of the display at the selectable link creation unit's respective position within the first workspace; the signals from the user including a first signal indicating a position within the first bounded area; and
   a link creation data unit that is accessible by the control means when the control means has accessed the first workspace data unit, the link creation data unit including link creation data for use by the control means in responding to the first signal by creating in the workspace network data structure a linking data unit linking the first workspace data unit and a second workspace data unit relating to a second workspace; the second workspace including a second set of display features, each display feature in the second set haviing a respective position within the second workspace; the link creation data including location data indicating a relation between the selectable link creation unit's respective position and a selectable linking unit's respective position within the first workspace; the location data being for use by the control means in responding to the first signal by presenting the selectable linking unit at its respective position within the first workspace; the second workspace data unit being accessible by the control means for use in presenting the second workspace on the display;
   the method comprising steps of:
   accessing the first workspace data unit and presenting the first workspace on the display;

upon receiving the first signal, accessing the link creation data unit; and using the link creation data in the link creation data unit to create the linking data unit.

23. The method of claim 22 in which the step of accessing the first workspace data unit and presenting the first workspace comprises a substep of presenting the selectable link creation unit in the first workspace; the selectable link creation unit including the first bounded area of the display; the method further comprising steps of:

receiving a second signal from the input device, the second signal indicating a position within the first bounded area of the display, the second signal requesting link creation from the first workspace to a third workspace, the third workspace including a third set of display features, each display feature in the third set having a respective position within the third workspace; and in response to the second signal, creating a second linking data unit within the workspace network data structure in addition to the first above-mentioned linking data unit, the second linking data unit linking the first workspace data unit and a third worskapce data unit relating to the third workspace.

* * * * *